(12) United States Patent
Wu et al.

(10) Patent No.: US 11,796,680 B2
(45) Date of Patent: Oct. 24, 2023

(54) LENS AND INTEGRATED BEAM TRANSCEIVER BASED LIDAR DETECTION DEVICE

(71) Applicant: Shanghai Jiao Tong University, Shanghai (CN)

(72) Inventors: Kan Wu, Shanghai (CN); Chao Li, Shanghai (CN); Xianyi Cao, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 528 days.

(21) Appl. No.: 16/994,383

(22) Filed: Aug. 14, 2020

(65) Prior Publication Data

US 2021/0373162 A1 Dec. 2, 2021

(30) Foreign Application Priority Data

Jun. 2, 2020 (CN) .......................... 202010487782.1

(51) Int. Cl.
*G01S 7/481* (2006.01)
*G01S 17/894* (2020.01)
*G02B 6/35* (2006.01)

(52) U.S. Cl.
CPC .......... *G01S 17/894* (2020.01); *G01S 7/4813* (2013.01); *G01S 7/4817* (2013.01); *G01S 7/4818* (2013.01); *G02B 6/3548* (2013.01)

(58) Field of Classification Search
CPC ................................................... G01S 7/4817
See application file for complete search history.

(56) References Cited

U.S. PATENT DOCUMENTS

| 2014/0147079 | A1* | 5/2014 | Doerr ...................... G02B 6/34 |
| | | | 385/37 |
| 2017/0299697 | A1* | 10/2017 | Swanson ................. G01N 21/17 |
| 2019/0257927 | A1* | 8/2019 | Yao ........................ G01S 17/931 |
| 2019/0363520 | A1* | 11/2019 | Laflaquiere ........... H01S 5/0261 |
| 2020/0142039 | A1* | 5/2020 | Liu .......................... G01S 17/10 |
| 2020/0278426 | A1* | 9/2020 | Dummer ............... G01S 7/4815 |

(Continued)

OTHER PUBLICATIONS

A. F. Turner, "Anti-Reflection Films on Glass," reprint from Educational Focus (1941). (Year: 1941).*

(Continued)

*Primary Examiner* — Yuqing Xiao
*Assistant Examiner* — Zhengqing Qi
(74) *Attorney, Agent, or Firm* — MEI & MARK LLP; Manni Li

(57) ABSTRACT

Lidar detection device based on a lens and an integrated beam transceiver, comprising a laser, a coupling fiber, a substrate, an input waveguide, a connection waveguide, a 1×N optical switch, a switch electrical interface, N switch output waveguides, N transceiving units, an off-chip processor and a lens, wherein N is a positive integer above 2. The invention can realize three-dimensional detection of a target, and the invention has the characteristics of two-dimensional beam steering independent of wavelength switching, low control complexity, low electric power consumption, receiving and emitting monolithic integration and high receiving efficiency, and being compatible with two laser ranging functions of ToF and FMCW.

10 Claims, 3 Drawing Sheets

(56) References Cited

U.S. PATENT DOCUMENTS

2021/0116778 A1\* 4/2021 Zhang .................. E06B 9/34
2022/0171026 A1\* 6/2022 Bakish ................ G01S 7/4812

OTHER PUBLICATIONS

R. Fitzpatrick, "Reflection at a dielectric boundary" accessed from "farside.ph.utexas.edu/teaching/em/lectures/node104.html" with WayBack Machine dated Nov. 27, 2005. (Year: 2005).\*

Ali K. Okyay, Ammar M. Nayfeh, Krishna C. Saraswat, Takao Yonehara, Ann Marshall, and Paul C. McIntyre, "High-efficiency metal-semiconductor-metal photodetectors on heteroepitaxially grown Ge on Si," Opt. Lett. 31, 2565-2567 (2006). (Year: 2006).\*

Efe Onaran, M. Cengiz Onbasli, Alper Yesilyurt, Hyun Yong Yu, Ammar M. Nayfeh, and Ali K. Okyay, "Silicon-Germanium multi-quantum well photodetectors in the near infrared," Opt. Express 20, 7608-7615 (2012). (Year: 2012).\*

\* cited by examiner

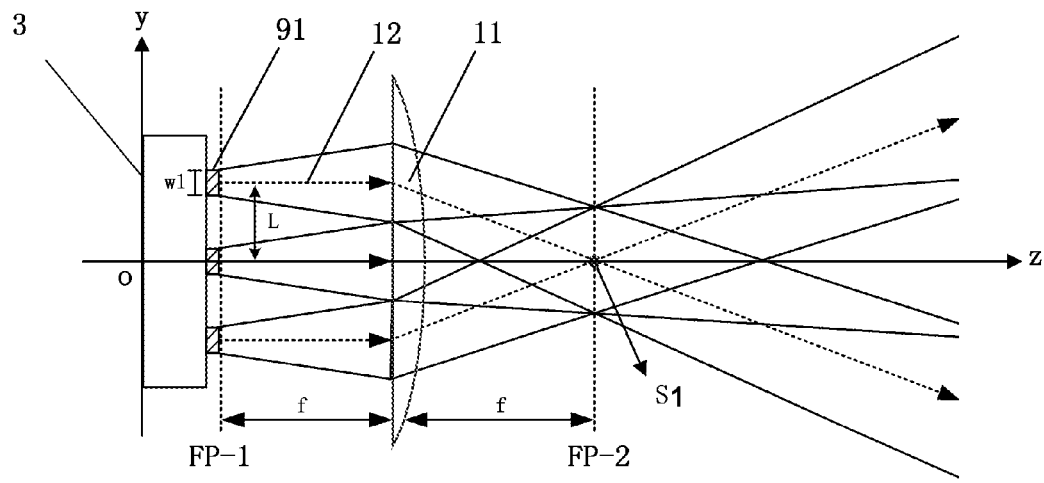
FIG. 3
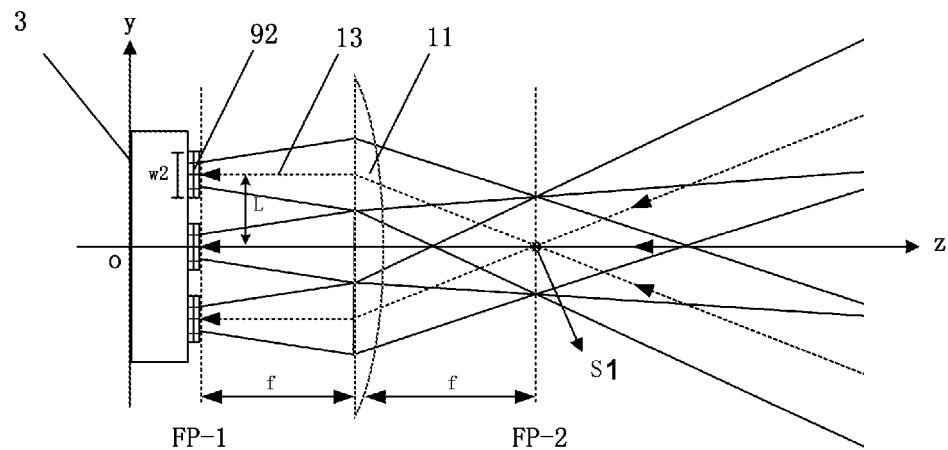
FIG. 4
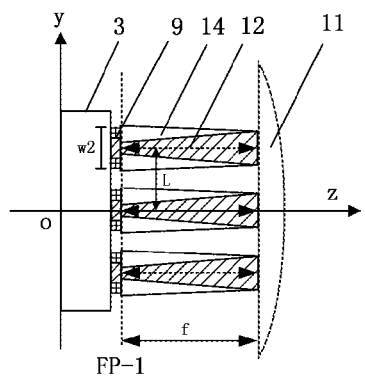          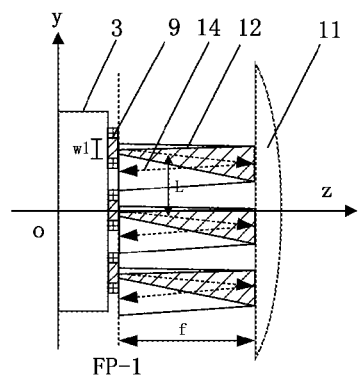
FIG. 5A                    FIG. 5B

LENS AND INTEGRATED BEAM TRANSCEIVER BASED LIDAR DETECTION DEVICE

CROSS-REFERENCE TO RELATED APPLICATION

The subject application claims priority on Chinese patent application no. 202010487782.1 filed on Jun. 2, 2020 in China. The contents and subject matter of the Chinese priority application is incorporated herein by reference.

TECHNICAL FIELD

The present invention relates to a lidar, in particular to a lidar detection device based on a lens and an integrated beam transceiver.

BACKGROUND ART

The lidar has wide application in geographical environment detection and climate monitor, and as requirements for high speed and miniaturization get higher, it plays an important role in the fields of unmanned driving and machine vision. Lidar includes two functional technologies. The first technology is the point-to-point laser ranging technology, which includes specific adopted schemes including Time of Flight (ToF) scheme and Frequency-Modulated Continuous Wave (FMCW) scheme. The ToF scheme performs distance measurement by measuring time delays of emitted and received pulsed light, and the FMCW scheme performs distance and motion speed measurement by beat frequency of emitted and received frequency modulated waves. The second technology is the beam scanning technology, which includes the traditional mechanical scanning and novel all-solid-state scanning. At present, the major technology in use is the one based on mechanical rotation schemes, which are large in size, heavy in weight, and easy to be disturbed by the environment. In comparison, the all-solid-state structure based scanning scheme as reported in recent years has become a research hotspot because of its small size, light weight, fast speed, and the feature of not being easily disturbed. With the increasing demand for miniaturization, low cost, and fast response, lidar that is based on all-solid-state scanning technology will have competitive advantages. Additionally, an optical transceiving system is an important component of the lidar, and compared with seperate optical systems for emitting and receiving, the optical transceiving system can provide advantages in the aspects of volume, weight, cost, reliability and the like by using a set of optical system to simultaneously emit and receive optical signals.

The all-solid-state beam scanning technology based lidar, which has been reported at present, mainly comprises the following 4 schemes:

Scheme 1: lidar based on integrated optical phased array (OPA) beam scanning technology. The beam scanning of the scheme adopts an optical phased array technology. The pointing angle of the far-field beam is controlled by controlling the phases of the emission beams in an array of on-chip emitters, such as gratings or end-face emitters. The optical phased array technology realizes the continuous adjustment of the beam pointing angle, however, the phase control of all the emitted optical signals on the chip is needed, the control complexity is high, the electric power consumption is high, and the signal-to-noise ratio of the main lobe relative to the background noise is low. The optical phased array technology based lidar has been reported to emit and receive optical signals by making the emitting grating array and the receiving grating array on the chip at the same time, but the efficiency of coupling the returning signal to the receiving grating is low and the measuring distance is limited. If a detector array or the like is used to receive the returning signal, additional optical systems are required.

Scheme 2: lidar based on microelectro mechanical systems (MEMS) beam scanning technology. The beam scanning of the scheme is realized by controlling the MEMS micro-mirror, but the steering speed of the MEMS micro-mirror is slow. Therefore, the beam scanning speed is limited. As the MEMS micro-mirror is still a mechanical structure in nature, the possibility that mechanical fatigue leads to device failure exists. The scheme needs space light to emit and receive beams, so the system is large in size. Compared with a chip-based solid-state lidar scheme, the scheme is more susceptible to environmental disturbance.

Scheme 3: Flash lidar. The beam scanning of the scheme is realized by combining a laser array with a lens. By fabricating the laser array on a chip and placing the emission plane of the laser array on the focal plane of one lens, the laser emitted by each laser can be directed to a specific angle after being collimated by the lens. Beam scanning can be achieved by sequentially turning on different lasers. However, the laser array is high in cost, each laser needs independent driving control, the control complexity is high, the semiconductor laser cannot realize high output power, and the measurement distance is limited. The receiving system usually uses a detector array. If the detector array is integrated with the laser array, i.e., each unit contains one emitting laser and one receiving detector, one lens can be shared, but the control complexity is high. If separated, two lenses, i.e., two sets of optical systems, are required.

Scheme 4: lidar based on switch switching and lens collimated beam scanning technology. According to the scheme, beam scanning switches the beam transmission through on-chip switches and uses off-chip or on-chip lenses to achieve beam collimation and deflection. At present, three beam scanning schemes to realize beam deflection are proposed, which are integrated on-chip planar lens, on-chip two-dimensional array grating transmission combined with an off-chip lens, and on-chip one-dimensional photonic crystal grating combined with an off-chip lens. It has the advantages of low control complexity and low power consumption. At present, the proposed receiving scheme adopts on-chip grating to receive returning signals, but the receiving efficiency is low and the detection range is limited.

In general, the lidar has the problems that the control complexity is high, the scanning capability is limited, the beam receiving efficiency is low, and the transceiving cannot be monolithically integrated. Therefore, there is a need for an all-solid-state lidar device that overcomes the deficiencies of the above-described technical solutions and provides advantages of low control complexity, low electrical power consumption, two-dimensional scanning independent of wavelength switching, transceiver monolithic integration, and high beam receiving efficiency.

SUMMARY OF THE INVENTION

The present invention solves the problems by overcoming the defects of the current technology and provides a lidar detection device that is based on a lens and an integrated beam transceiver, wherein the device realizes three-dimensional detection of a target and has the characteristics of two-dimensional beam steering independent of wavelength switching, low control complexity, low electric power consumption, receiving and emitting monolithic integration, and high receiving efficiency. The device of the present invention is compatible with two laser ranging functions of ToF and FMCW.

The present invention provides a lens and an integrated beam transceiver based lidar detection device, comprising a laser (1), a coupling fiber (2), a substrate (3), an input waveguide (4), a connection waveguide (5), a 1×N optical switch (6), a switch electrical interface (7) and N switch output waveguides (8), N transceiving units (9), an off-chip processor (10) and a lens (11), wherein N is positive integer above 2; the input waveguide (4), the connection waveguide (5), the 1×N optical switch (6), the switch electrical interface (7), the N switch output waveguides (8), and the N transceiving units (9) are prepared on the substrate (3) and form one integrated beam transceiver; light output by the laser (1) is coupled to the input waveguide (4) through the coupling fiber (2), and the input waveguide (4) is connected with the input end of the 1×N optical switch (6) through the connection waveguide (5), wherein the 1×N optical switch (6) has one input end and N output ends and the N output ends are respectively connected with the emission units in the N transceiving units (9) through the N switch output waveguides (8); the transceiving unit (9) comprises one emission unit, one receiving unit and one receiving unit electrical interface, wherein the receiving unit electrical interface is used for providing power supply and electrical signal output for the receiving unit; the N transceiving units (9) form a two-dimensional array on the upper surface of the substrate (3), and the lens (11) is positioned right above the N transceiving units (9), and the focal plane of the lens (11) is parallel to the plane where the N emitting units (9) are located; the optical axis of the lens (11) is perpendicular to the plane, wherein the lower surface of the lens (11) close to the emitting unit (9) is not coated with a film, and the upper surface of the lens (11) far away from the emitting unit is coated with an antireflection film with the same working wavelength; most of the beams emitted to space by the N emission units (9) are collimated and output through the lens (11), and a small part of the beams is reflected by the lower surface of the lens (11) and input into the receiving units corresponding to each emission unit as reference light (14); the off-chip processor (10) is electrically connected with N receiving units through receiving unit electrical interface in the N transceiving units (9) and supplies power to the receiving units and receives and processes electrical signals generated by receiving units; and the off-chip processor (10) is electrically connected with the 1×N optical switch (6) through the switch electrical interfaces (7) to provide switching control signals for the switches.

In the lidar detection device of the present invention, most of the beams emitted by the N emitting units (9) into space are about 96% of the beam, and a small part of the beam is about 4% of the beam.

In the lidar detection device of the present invention, the laser is a semiconductor laser, a fiber laser, a spatial light solid state laser, or other lasers.

In the lidar detection device of the present invention, the input waveguide, the connection waveguide, the 1×N optical switch, the switch output waveguide, the emission unit are made of silicon material, and the receiving unit is made of silicon-based germanium material.

In the lidar detection device of the present invention, the input waveguide is a tapered waveguide or Bragg grating, and correspondingly the coupling fiber is a lensed fiber or an 8° tangent plane angular plane fiber.

In the lidar detection device of the present invention, the 1×N optical switch is a binary tree structure, a series structure, or a combination structure of the two.

In the lidar detection device of the present invention, the N emitting units are of Bragg grating structure.

In the lidar detection device of the present invention, the N receiving units are vertical PIN photodiode structures doped with silicon-based germanium materials, wherein the receiving unit is U-shaped, and the emission unit is located in the middle of the U-shaped receiving unit.

In the lidar detection device of the present invention, the lens is a spherical plano-convex lens or an aspheric plano-convex lens.

In the lidar detection device of the present invention, the input waveguide, the connection waveguide, the switch output waveguide, and the emission unit all operate in a single mode transverse electric (TE) mode or a single mode transverse magnetic (TM) mode.

The beam scanning and transceiving principle of the present invention is that a focal plane of one side of a lens close to an emission unit is defined as a first focal plane, and a focal plane of the other side of the lens is defined as a second focal plane. The light field emitted to space by the emitting unit located on the first focal plane is reflected and emitted after passing through the lens, and the reflected light is used as reference light to be irradiated back to the corresponding receiving unit; and the emitted light is collimated into parallel light and the beam direction is deflected. According to the Fourier optics, light emitted from different emitting units can point to different angles after being collimated by a lens, and beam scanning can be realized by switching different emitting units to emit light. Besides, according to Fourier optics, after a beam is collimated and focused by a lens, an equivalent scanning light source is formed on the second focal plane, and switching different emitting units to emit light is equivalent to changing the pointing angle of the scanning light source. The returning light reflected by the target is converged by the lens and then irradiated to the area where the emission unit is located. Due to the divergence of the beam, the light spot of the returning light can be larger than the original emitting light spot of the emitting unit and can be received by the receiving unit. Both the reference light and the returning light can irradiate the same receiving unit, and the reference light and the returning light are overlapped in space so that for a ToF ranging mode, the reference light can generate a reference pulse signal in the detector, and measurement of the target distance can be realized through time comparison with the received returning pulse signal; and for FMCW ranging mode, the spatial overlap of the reference light and the returning light will produce beat frequency signal on the detector. According to the FMCW principle, the target distance and target speed can be measured according to this beat frequency signal. Therefore, the device can simultaneously support two ranging modes of ToF and FMCW.

According to the working process of the invention, output light of the laser sequentially passes through the input waveguide and the connection waveguide to be input to the input end of the 1×N switch after passing through the coupling fiber. A certain path is built through the switch, and a beam enters a specific emission unit via the output waveguide, and the beam is emitted to space by the emission unit, and the emission beam is reflected and emitted after passing through the lens, and the reflected light is used as reference light to be irradiated back to the corresponding receiving unit; and the emitted light is collimated and directed at a particular angle. After the emitted light irradiates the target to be measured, diffuse reflection is emitted and part of the light counter-propagates in the same path and opposite angle. After the returning light reaches the lidar, the returning light is focused on a receiving unit which is located at the same transceiving unit as the emission unit via the same lens. The reference beam generated by the lens and the returning light returned by the target, of a beam emitted by the same emitting unit will overlap and be received by the same receiving unit. The electrical signal generated after photoelectric conversion is output to the off-chip processor through the electrical structure of the receiving unit. The off-chip processor can obtain position information (ToF ranging) or position and speed information (FMCW ranging) of the target object by processing the received signal.

Compared with the existing technology, the present invention has the following advantages. Compared with a lidar scheme based on integrated optical phased array beam scanning, the off-chip signal control processor controls the 1×N optical switch through a switch electrical interface and completes a switching function. Only one path of optical signal emission is gated at the same time, phase control of each path of an emitted optical signal in a phased array scheme is not needed, and therefore control complexity and power consumption are low. At the same time, the grating lobe problem is avoided. Besides, the transceiving unit array disclosed by the invention can be monolithically integrated, and the received signals do not need to be independently processed as in a phased array scheme. Finally, the receiving unit formed by the silicon-based germanium PIN detector is adopted in the invention to directly detect the returning signals, and compared with a grating receiving and coupling-in waveguide efficiency of an optical phased array scheme, the efficiency is higher.

Compared with a lidar scheme based on MEMS beam scanning, the present invention adopts an all-solid-state structure, has no mechanical moving part, and is high in reliability. The emitting, receiving, and detecting processes are completed on a single chip, and the light path is simple.

Compared with a Flash lidar scheme, the present invention has the advantages that only one laser light source is needed, and the cost is lower, and is not limited to semiconductor lasers. Various laser types such as fiber lasers and solid-state lasers can be adopted, so that the problem of insufficient emission power of the semiconductor lasers is solved, and a large number of laser driving circuits are avoided.

The present invention belongs to a lidar scheme based on switch switching and lens collimated beam scanning. Compared with the existing lidar based on the scheme, the invention provides an integrated scheme of emitting, receiving and detecting, so that beam emitting, receiving and photodetection can be realized on one chip, and reflected light of the emitted light in a lens is used as reference light to be coupled into a detector of a receiving unit, and an all-solid-state lidar capable of simultaneously supporting two ranging modes of ToF and FMCW can be realized.

BRIEF DESCRIPTION OF THE DRAWINGS

FIG. 3 shows the emitting light path on section AA' in FIG. 1.

FIG. 4 shows the receiving light path on section AA' in FIG. 1.

FIGS. 5A and 5B show the reference beam light paths on section AA' in FIG. 1, where FIG. 5A shows a first reference light path where the beam 12 emitted by the emitting unit is parallel to the optical axis (z axis) of the lens 11, and FIG. 5B shows a second reference light path where the beam 12 emitted by the emitting unit has a certain angle with the optical axis (z-axis) of the lens 11.

DETAILED DESCRIPTION OF THE INVENTION

The present invention is further described with reference to the accompanying drawings and examples, which are not intended to limit the scope of the present invention.

Figure 1:
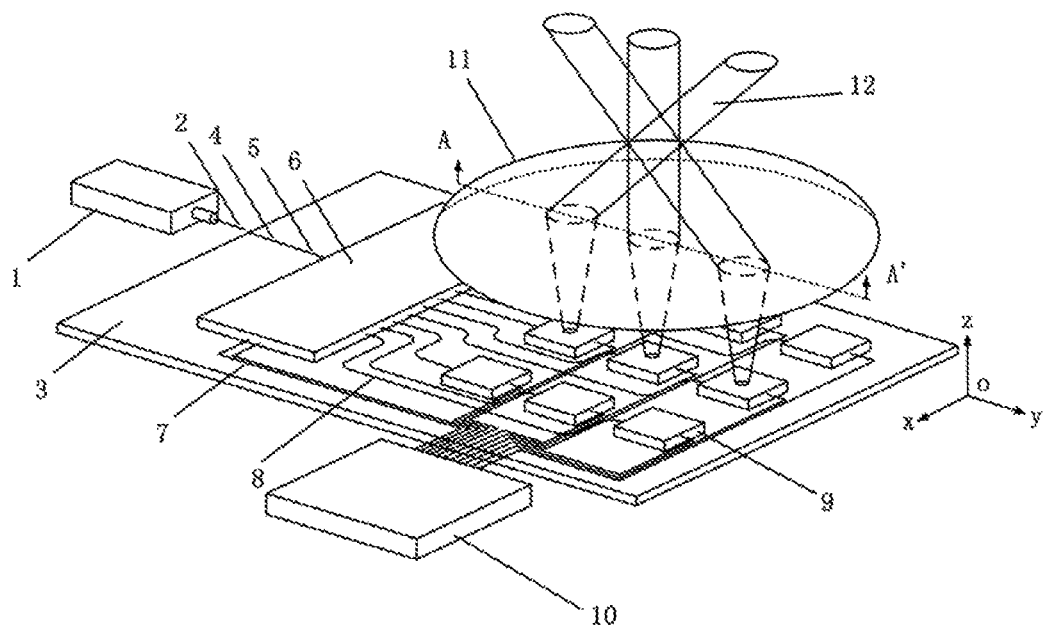
FIG. 1 shows a lens-based monolithically integrated lidar detection device in the first embodiment of the present invention.

As shown in FIG. 1, the first embodiment of a lidar detection device based on a lens and an integrated beam transceiver according to the present invention comprises a laser 1, a coupling fiber 2, a substrate 3, an input waveguide 4, a connection waveguide 5, a 1×N optical switch 6, a switch electrical interface 7, N switch output waveguides 8, N transceiving units 9, an off-chip processor 10, and a lens 11, wherein N is a positive integer of 2 or above. The input waveguide 4, the connection waveguide 5, the 1×N optical switch 6, the switch electrical interface 7, the N switch output waveguides 8 and the N transceiving units 9 are all prepared on the substrate and form an integrated beam transceiver. The light output by the laser 1 is coupled to the input waveguide 4 via a coupling fiber 2. The input waveguide 4 is connected to the input of a 1×N optical switch 6 via a connection waveguide 5. The 1×N optical switch 6 has one input end and N output ends, and the N output ends are respectively connected with the emission units in the N transceiving units 9 via N switch output waveguides 8. The transceiving unit 9 comprises an emission unit, a receiving unit, and a receiving unit electrical interface, wherein the receiving unit electrical interface is used for providing power supply and electrical signal output for the receiving unit. The N transceiving units 9 form a two-dimensional array on the upper surface of the substrate 3. The lens 11 is located right above the N transceiving units 9, and the focal plane of the lens 11 is parallel to the plane where the N emission units 9 are located. The optical axis of the lens 11 is perpendicular to the plane. The surface thereof (lower surface) close to the emission unit is uncoated, and the surface thereof (upper surface) far away from the emission unit is coated with an antireflection film having the same working wavelength. And most (about 96%) of the beams emitted to space by the N emitting units 9 are collimated and output through the lens 11. A small part (about 4%) of the beams is reflected by the lower surface of the lens 11 and is input into corresponding receiving units of each emitting unit as reference light 14. The off-chip processor 10 is electrically connected with the N receiving units through receiving unit electrical interfaces in the N transceiving units 9, providing power for the receiving units, and receiving and processing electrical signals generated by the receiving units. The off-chip processor 10 is electrically connected with the 1×N optical switch 6 through the switch electrical interface 7 to provide a switching control signal for the switch.

In the first embodiment, N=9.

The laser 1 may be a semiconductor laser, a fiber laser, a spatial light solid state laser, or other lasers.

The input waveguide 4, the connection waveguide 5, the 1×N optical switch 6, the switch output waveguide 8, and the emission unit in the transceiving unit 9 are made of silicon material, and the receiving unit of the transceiving unit 9 is made of silicon-based germanium material.

The input waveguide 4 is a tapered waveguide or Bragg grating, and correspondingly the coupling fiber 2 is a tapered lensed fiber or an 8° tangent plane angular plane fiber.

The 1×N optical switch 6 is a binary tree structure, or a series structure or a combination structure of the two.

The lens 11 is a spherical plano-convex lens or an aspheric plano-convex lens.

The input waveguide 4, the connection waveguide 5, and the switch output waveguide 8 all work in a single-mode transverse electric mode or a single-mode transverse magnetic mode.

All of these devices operate in a single mode transverse electric (TE) mode.

As shown in FIG. 1, the light paths of three emission beams 12 are shown as emitted from three different transceiving units 9 through a lens 11 to free space at different times, which demonstrates the deflection of the beams 12 emitted by different transceiving units 9 through the lens 11. It should be noted that only one transceiving unit of the present invention has beams to emit at any time.

The coupling fiber 2 is a tapered lensed fiber; the input waveguide 4 is a tapered waveguide; the coupling fiber 2 and the input waveguide 4 are subjected to chip end-face coupling; and other structures for realizing optical signal coupling can be adopted for the coupling fiber 2 and the input waveguide 4.

Preferably, the coupling fiber 2 is a tapered lensed fiber and the input waveguide 4 is a tapered waveguide, the two being end-face coupled.

The working area of the lens 11 is large enough so that the beams emitted from the N transceiving units 9 can illuminate the working area of the lens 11.

Figure 2:
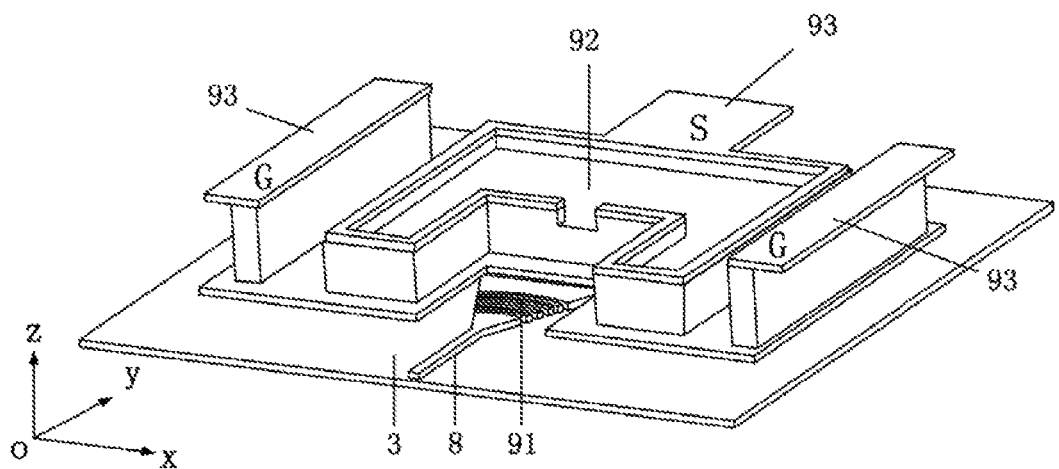
FIG. 2 shows the structure of the transceiving unit in the lens-based monolithically integrated lidar detection device as shown in FIG. 1.

As shown in FIG. 2, the device structure of the transceiving unit 9 of FIG. 1 comprises a emission unit 91, a receiving unit 92 and a receiving unit electrical interface 93. On the substrate 3, the beam in the waveguide is input through the switch output waveguide 8 to an emission unit 91, which is a Bragg grating. The receiving unit 92 is a vertical PIN photodiode structure doped with a silicon-based germanium material, wherein the receiving unit is U-shaped, and the emission unit is located at the center of the U-shaped receiving unit. G and S shown in FIG. 2 correspond to the ground electrode and the signal electrode, i.e., the receiving unit electrical interface 93, of the photodiode, respectively.

The emission unit 91 operates in a single-mode transverse electric mode or a single-mode transverse magnetic mode.

As shown in FIG. 3, the light path of the light emitted from cross section AA' in FIG. 1 is as follows: the emitted beam 12 is emitted from the emitting unit 91 (width w1, interval L) on substrate 3 and passes through the lens 11, and the beam is collimated and deflected. When the center line of the beam (dotted line in the beam in FIG. 3) is parallel to the optical axis of the lens 11 and travels in the z-direction, the three different beams will intersect at the focal plane FP-2 behind the lens, and the center line of the beam intersects at the focal point 51. When the 51 point is used as the virtual light source, the beams emitted from the different emitting units 91 is equivalent to beams emitted in different directions from the virtual light source at 51 point. As shown in FIG. 2, the focal plane FP-1 of the lens 11 on the side of the emission unit 91 coincides with the emission plane of the emission unit 91. Therefore, the light field emitted by the virtual light source point 51 on the FP-2 plane has the same mode field distribution as that on the FP-1 plane, i.e., the emitting spot of the emitting unit determines the far-field divergence angle.

As shown in FIG. 4, the receiving light path in section AA' in FIG. 1 is as follows. The spatial returning light 13 is the light returned by the original path after the emission beam 12 of the emission unit 91 irradiates the target, and is collected and focused by the lens 11 to irradiate the receiving unit 92 located on the same transceiving unit as the emission unit 91. Because the beam has divergence, the spot of the returning light can be larger than the originally emitted spot of the emitting unit, and the size of the receiving unit is larger than that of the emitting unit (w2>w1) so that the returning light can be received by the receiving unit.

As shown in FIGS. 5A and 5B, the reference beam light path taken along section AA' in FIG. 1 is as follows. The reference light 14 is a beam (about 4%) reflected after the beam emitted from the emitting unit 91 irradiates the surface of the lens 11 close to the emitting unit and serves as a reference light for target detection. The reflection angle is determined by the grating emission angle, and FIG. 5A shows a first schematic diagram of a reference light path, wherein the beam 12 emitted by the emitting unit is parallel to the optical axis (z axis) of the lens 11, and then the reflected beam irradiates a receiving unit which is located on the same transceiving unit 9 as the emitting unit along the original path. Since the emitted beam 12 has a certain divergence angle, the light spot irradiated to the transceiving unit is larger than the light spot of the emitted beam. FIG. 5B shows a second schematic diagram of the reference light path, when the beam 12 emitted by the emitting unit has a certain angle with the optical axis (z-axis) of the lens 11, the reference light 14 and the beam transmission path of the emitting light 12 can be spatially overlapped by constraining the emitting angle, the divergence angle, the receiving unit area and the focal length of the lens of the emitting unit. And the overlapping area can be covered to be on the receiving unit of the same transceiving unit as the emission unit. Since the spatial returning light 13 can be irradiated to the receiving unit of the same transceiving unit after being focused by the lens 11 as in FIG. 4, and has the same beam transmission path as the emitting light 12, the reference light 14 can spatially overlap with the spatial returning light 13. Likewise, the overlapping area can cover the receiving unit of the same transceiving unit and be photoelectrically converted into an electric signal by the receiving unit.

Figure 6:
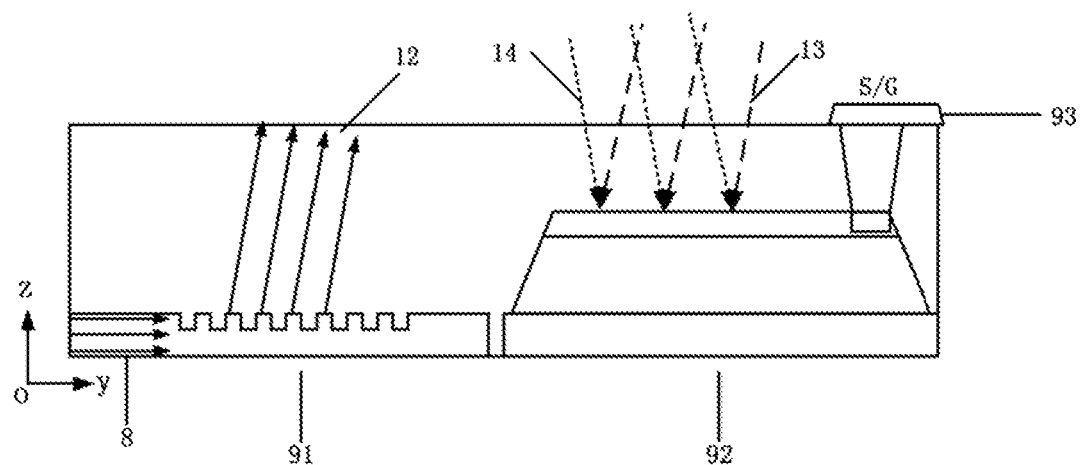
FIG. 6 shows the xoz cross-sectional structure of the receiver in FIG. 2.

As shown in the cross-sectional view along the center of symmetry of the transceiving unit in the yoz plane of FIG. 2 in FIG. 6, the beam in the waveguide travels from waveguide transmission output by the switch into an emitting unit 91, which is a Bragg grating structure. The emitting unit 91 emits the beam into free space, i.e., the emitted beam 12. The spatial returning light 13 and the reference light 14 overlap in space and cover and irradiate the receiving unit 92, and are connected to the off-chip processor 10 through the receiving unit electrical interface 93 after photoelectric conversion.

Figure 7:
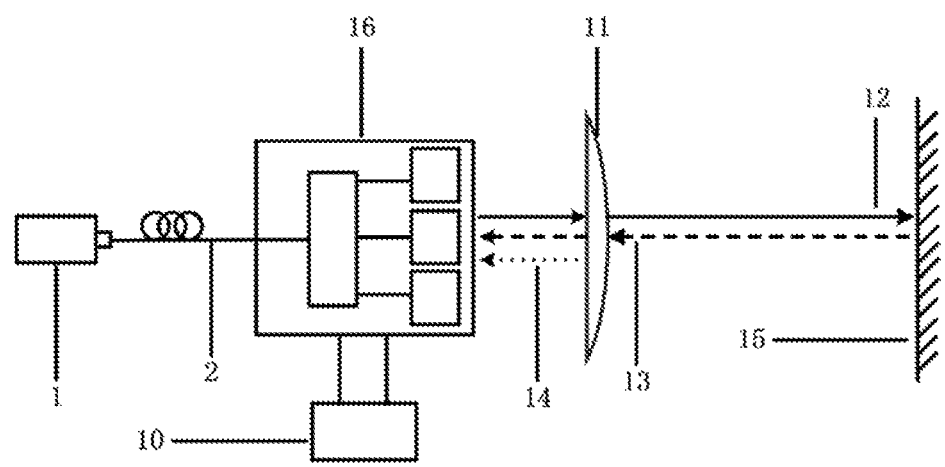
FIG. 7 shows the yoz cross-sectional structure of the transceiver in FIG. 2.

As shown in FIG. 7, the lidar detection system in the present invention is as follows: the light source generated by the laser 1 needs to be input into the switched integrated beam transceiver 16 according to the present invention through the coupling fiber 2 in an end-face coupling manner. The beam 12 emitted by the emitting unit is reflected and emitted through the lens 11 to generate a reference beam 14 and an emission beam, respectively. The reference light 14 is irradiated back to the receiving unit of the transceiving unit, and the emitted light is collimated and focused through the lens and irradiated to the target 15 through the free space, and diffuse reflection is formed on the surface. Part of the reflected light is returned to the device according to the original path, namely the spatial returning beam 13, which is focused on the receiving unit of the transceiving unit through the lens 11. The reference light 14 and the spatial returning light 13 are detected by a receiver after spatial aliasing, and electrical signals obtained through photoelectric conversion are emitted to an off-chip signal control processor 10 through an electrical interface of a transceiving unit, and the position and the moving speed of a target object 15 are obtained after processing and analyzing the signals.

The laser 1 can be a pulsed laser (ToF ranging) or a frequency-modulated continuous-wave laser (FMCW ranging) according to the detection technique.

The coupling fiber 2 is a tapered lensed fiber.

In summary, the present invention has an all-solid-state structure, no mechanical moving parts, and high reliability. Only one transceiving unit works at the same time according to the present invention, and the control complexity and the power consumption are low. According to the invention, the two-dimensional beam scanning independent of wavelength switching is realized, and the scanning range and the divergence angle are controlled by changing the size, the interval, and the focal length of the lens of the emission unit array. The present invention can realize the monolithic integration of the receiving unit and the emission unit, and has the characteristics of process compatibility, high speed, high sensitivity, and the like. The present invention adopts on-chip direct detection of optical signals, and has the characteristic of high receiving efficiency. Based on the device of the present invention and the detection technology of the lidar, a target three-dimensional detection function can be realized, wherein two detection technologies of TOF and FMCW are compatible, and the device and the detection technology of the lidar have the characteristics of all-solid-state, small size, low power consumption, integrated transceiving, and rapid response.

We claim:

1. A lens and integrated beam transceiver-based lidar detection device, comprising:
    a laser (1),
    a coupling fiber (2),
    a substrate (3),
    an input waveguide (4),
    a connection waveguide (5),
    a 1×N optical switch (6), wherein the 1×N optical switch (6) comprises one input end and N output ends,
    a switch electrical interface (7),
    N switch output waveguides (8),
    N transceiving units (9), wherein each of the N transceiving units comprises an emission unit, a receiving unit, and a receiving unit electronic interface, the N transceiving units (9) form an array on an upper surface of the substrate (3), all the emission units of the N transceiving units (9) are on a plane defined as an emission plane, the receiving unit is adapted to receive spatially overlapping reference light and spatial returning light originating from the emission unit in the same transceiving unit and generating an electronic signal for processing,
    an off-chip processor (10), wherein the off-chip processor (10) is electrically connected with the receiving units of the N transceiving units (9) via the receiving units electronic interfaces to supply power to the receiving units and receives and processes the electrical signals generated by the receiving units and with the 1×N optical switch (6) via the switch electrical interface (7) to provide switching control signals, and
    a lens (11), wherein the lens (11) comprises a lower plano surface close to the N transceiving units (9) and not being coated with a film, an upper convex surface away from the N transceiving units (9) and being coated with an antireflection film with a same working wavelength as the emitting units, a first focal plane coinciding with the emission plane of the emitting units, and an optical axis perpendicular to the first focal plane,
    wherein N is a positive integer above 2;
    the input waveguide (4), the connection waveguide (5), the 1×N optical switch (6), the switch electrical interface (7), the N switch output waveguides (8), and the N transceiving units (9) are monolithically integrated on the substrate (3) to form an all-solid-state beam transceiver with no mechanical moving parts;
    each of the N output ends of the 1×N optical switch (6) is respectively connected with a corresponding emission unit of the N transceiving units (9) through a corresponding switch output waveguide of the N switch output waveguides (8);
    light output by the laser (1) is coupled to the input waveguide (4) through the coupling fiber (2), and the input waveguide (4) is connected with the input end of the 1×N optical switch (6) through the connection waveguide (5), and passes from the output end of the 1×N optical switch (6) to the corresponding emitting unit of the N transceiving units (9) through the corresponding switch output waveguide of the N switch output waveguides (8);
    a large portion of the beams emitted to space by the N emission units are collimated and output through the lens (11) to form emitting beams (12), and a small portion of the beams are reflected by the lower surface of the lens (11) and input into the receiving units corresponding to each emission unit as reference light (14);
    the emitting beams (12) are irradiated on a target and returned as returning lights, and a returning light that follows a beam transmission path of the emitting beam (12) forms a corresponding spatial returning light (13);
    the corresponding spatial returning light (13) and the reference light (14) originating from the same emitting unit of one of the N transceiving units (9) spatially overlap to form the overlapping area on the receiving unit in the same transceiving unit (9) as the same emitting unit and are detected by the receiving unit, and the receiving unit generates electrical signals based on the overlapping area of the reference light (14) and the corresponding spatial returning light (13) and sends to the off-chip processor (10) for processing.

2. The lidar detection device as described in claim 1, wherein the large portion of the beams emitted by the emitting units into space are about 96% of the beams, and the small portion of the beams are about 4% of the beams.

3. The lidar detection device as described in claim 1, wherein the laser is a semiconductor laser, a fiber laser, or a spatial light solid state laser.

4. The lidar detection device as described in claim 1, wherein the input waveguide, the connection waveguide, the 1×N optical switch, the switch output waveguide, and the emission unit are made of a silicon material, and the receiving unit is made of a silicon-based germanium material.

5. The lidar detection device as described in claim 1, wherein the input waveguide is a tapered waveguide or Bragg grating, and the coupling fiber is correspondingly a tapered lensed fiber or an 8° tangent plane angular plane fiber.

6. The lidar detection device as described in claim 1, wherein the 1×N optical switch is a binary tree structure, a series structure, or a combination thereof.

7. The lidar detection device as described in claim 1, wherein the N emitting units are of a Bragg grating structure.

8. The lidar detection device as described in claim 1, wherein the N receiving units are vertical PIN photodiode structures doped with silicon-based germanium materials, the receiving unit is U-shaped, and the emission unit is located in the middle of the U-shaped receiving unit.

9. The lidar detection device as described in claim 1, wherein the lens is a spherical plano-convex lens or an aspheric plano-convex lens.

10. The lidar detection device as described in claim 1, wherein the input waveguide, the connection waveguide, the switch output waveguide, and the emission unit all operate in a single mode transverse electric (TE) mode or a single mode transverse magnetic (TM) mode.

\* \* \* \* \*